(12) United States Patent
Liu et al.

(10) Patent No.: US 10,720,975 B2
(45) Date of Patent: *Jul. 21, 2020

(54) COMMUNICATION METHOD, NETWORK DEVICE, AND TERMINAL DEVICE

(71) Applicant: Huawei Technologies Co., Ltd., Shenzhen (CN)

(72) Inventors: Yong Liu, Shanghai (CN); Xiang Ren, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/575,747

(22) Filed: Sep. 19, 2019

(65) Prior Publication Data

US 2020/0014436 A1 Jan. 9, 2020

Related U.S. Application Data

(63) Continuation of application No. 16/135,267, filed on Sep. 19, 2018, now Pat. No. 10,461,822, which is a
(Continued)

(30) Foreign Application Priority Data

Jan. 12, 2018 (CN) .......................... 2018 1 0030620

(51) Int. Cl.
*H04B 7/04* (2017.01)
*H04B 7/0456* (2017.01)
(Continued)

(52) U.S. Cl.
CPC ......... *H04B 7/0465* (2013.01); *H04B 7/0478* (2013.01); *H04L 1/0029* (2013.01);
(Continued)

(58) Field of Classification Search
CPC . H04L 5/0053; H04L 5/0044; H04L 25/0222; H04L 5/0023; H04L 5/0035;
(Continued)

(56) References Cited

U.S. PATENT DOCUMENTS 10,461,822 B2 * 10/2019 Liu ........................ H04L 5/003
2012/0188950 A1 7/2012 Luo et al.
(Continued)

FOREIGN PATENT DOCUMENTS

CN 101132598 A 2/2008
CN 101621846 A 1/2010
(Continued)

OTHER PUBLICATIONS

"3rd Generation Partnership Project; Technical Specification Group Radio Access Network; Evolved Universal Terrestrial Radio Access (E-UTRA); Physical layer procedures (Release 14)," 3GPP TS 36.213 V14.5.0, Dec. 2017, 462 pages.
(Continued)

*Primary Examiner* — Rahel Guarino
(74) *Attorney, Agent, or Firm* — Slater Matsil, LLP

(57) ABSTRACT

A communication method, including performing, by a terminal device, in response to a value of a resource bundling granularity being a first-type value, determining at least one resource block bundling group in a scheduling resource corresponding to a terminal device according to the first-type value of the resource bundling granularity, wherein, the first-type value comprises 2 or 4, and receiving, using the at least one resource block bundling group, data transmitted by a network device. The method further includes performing, by the terminal device, in response to the value of the resource bundling granularity being a second-type value, determining a scheduling resource corresponding to the terminal device as a same resource block bundling group, wherein, the second-type value comprises a size of a consecutive scheduling bandwidth of the terminal device, and receiving, using the resource block bundling group, data transmitted by the network device.

24 Claims, 7 Drawing Sheets

Related U.S. Application Data continuation of application No. PCT/CN2018/083157, filed on Apr. 16, 2018.

(51) Int. Cl.
　　*H04L 1/00*　　　　(2006.01)
　　*H04L 5/00*　　　　(2006.01)
　　*H04L 25/02*　　　(2006.01)

(52) U.S. Cl.
　　CPC ........ *H04L 5/0044* (2013.01); *H04L 25/0222* (2013.01); *H04L 5/0053* (2013.01)

(58) Field of Classification Search
　　CPC .. H04L 5/0057; H04L 1/0029; H04W 72/044; H04W 72/0446; H04W 72/0493; H04W 72/1284; H04W 72/1289; H04B 7/0456; H04B 7/0465; H04B 7/0478
　　See application file for complete search history.

(56) References Cited

U.S. PATENT DOCUMENTS

| | | | |
|---|---|---|---|
| 2015/0146681 A1 | 5/2015 | Liu et al. | |
| 2018/0152923 A1 | 5/2018 | Xiong et al. | |
| 2019/0260436 A1* | 8/2019 | Davydov | H04B 7/0456 |

FOREIGN PATENT DOCUMENTS

| | | |
|---|---|---|
| CN | 101771449 A | 7/2010 |
| CN | 102316581 A | 1/2012 |
| CN | 102948086 A | 2/2013 |
| CN | 107548539 A | 1/2018 |
| WO | 2014117712 A1 | 8/2014 |

OTHER PUBLICATIONS

"3rd Generation Partnership Project; Technical Specification Group Radio Access Network; NR; Physical layer procedures for data (Release 15)," 3GPP TS 38.214 V15.0.0, Dec. 2017, 71 pages.

"Further Discussion on DL PRB Bundling," Source: Xinwei, Agenda Item 5.11.1.5, Document for: Discussion and Decision, R1-1709905, 3GPP TSG-RAN WG1 NR#2, Jun. 27-30, 2017, 11 pages.

"PRB bundling size for DL data precoding," Agenda Item: 7.1.2.1.6, Source: Huawei, HiSilicon, Document for: Discussion and decision, R1-1708133, 3GPP TSG RAN WG1 Meeting #89, Hangzhou, China, May 15-19, 2017, 8 pages.

"PDSCH and PUSCH resource allocation," Source: CATT, Agenda Item: 7.3.3.1, Document for: Discussion and Decision, R1-1717833, 3GPP TSG RAN WG1 Meeting 90bis, Prague, CZ, Oct. 9-13, 2017, 9 pages.

"Discussion on PRB bundling for DL," Agenda item: 7.2.1.4, Source: Qualcomm Incorporated, Document for: Discussion/Decision, R1-1720659, 3GPP TSG RAN WG1 Meeting 91, Reno, USA, Nov. 27-Dec. 1, 2017, 7 pages.

\* cited by examiner

COMMUNICATION METHOD, NETWORK DEVICE, AND TERMINAL DEVICE

CROSS-REFERENCE TO RELATED APPLICATIONS

This application is a continuation of U.S. patent application Ser. No. 16/135,267, filed on Sep. 19, 2018, which is a continuation of International Application No. PCT/CN2018/083157, filed on Apr. 16, 2018. The International Application claims priority to Chinese Patent Application No. 201810030620.8, filed on Jan. 12, 2018. All of the aforementioned patent applications are hereby incorporated by reference in their entireties.

TECHNICAL FIELD

This application relates to the communications field, and in particular, to a communication method, a network device, and a terminal device.

BACKGROUND

A physical resource block (PRB) bundling (PRB bundling) is a technology used to improve channel estimation performance. The PRB bundling is to bind a plurality of consecutive PRBs together for joint processing. A network device may perform same preprocessing (including beamforming and precoding) on the plurality of PRBs (or referred to as a precoding resource block group (PRG)). A terminal device may perform joint channel estimation across the plurality of PRBs. When the terminal device performs the joint channel estimation across the plurality of PRBs, extrapolation computation of the channel estimation may be reduced, and accuracy of the channel estimation may be improved.

In different scenarios (channel environments), comprehensively considering a channel estimation gain, terminal implementation complexity, a forming gain, and a scheduling status, optimal sizes of PRB bundling may be different.

During PRB bundling, according to a stipulation of an existing protocol, the network device determines a size of a precoding resource block group by using a unique method by default, and the terminal device determines a size of resource block bundling by using a unique method by default. However, in existing PRB application, the size of the precoding resource block group or the size of the resource block bundling is determined by using a default method, and consequently the existing PRB bundling application is not flexible, and it is difficult to meet requirements for different values of a PRB bundling size.

SUMMARY

This application provides a communication method, a network device, and a terminal device, and the method can meet requirements for different values of a PRB bundling size.

According to a first aspect, a communication method is provided, and the method includes determining, by a network device based on a value of a resource bundling granularity, at least one precoding resource block group in a scheduling resource corresponding to a terminal device, where a type of the value of the resource bundling granularity is one of a first-type value and a second-type value, and a precoding resource block group determining method corresponding to the first-type value is different from a precoding resource block group determining method corresponding to the second-type value, and transmitting, by the network device, data to the terminal device by using the at least one precoding resource block group.

It should be understood that in this embodiment of this application, the resource bundling granularity may also be referred to as a resource bundling size. The resource bundling granularity may be a physical resource block bundling (PRB bundling) granularity or a precoding resource block group (PRG) granularity. This embodiment of this application is not limited thereto. The PRG granularity may indicate a quantity of consecutive PRBs on which same precoding is performed by a transmit end, and the PRB bundling granularity may indicate a quantity of PRBs on which joint channel estimation is performed by a receive end.

In this embodiment of this application, the PRG may be corresponding to the PRB bundling group, and resource bundling on different communication device sides may have different names but a same meaning. For example, a resource bundling granularity on a transmit end (for example, the network device) side is referred to as the PRG, and the transmit end performs same precoding on data transmitted in a same PRG. A resource bundling granularity on a receive end (for example, the terminal device) side is referred to as the PRB bundling group, and the receive end performs the joint channel estimation on data transmitted in a same PRB bundling group.

It should be noted that the PRG and the PRB bundling group are interchangeable. For example, resource bundling on each of the transmit end side and the receive end side may be the PRG, or resource bundling on each of the transmit end side and the receive end side may be the PRB bundling group. This embodiment of this application is not limited thereto.

It should be understood that the PRG on a network device side may be corresponding to the PRB bundling group on a terminal device side. For a same value of the resource bundling granularity, a method for determining a PRG on the network device side and a method for determining a PRB bundling group on the terminal device side may be the same. However, on a same side, namely, on the network device side or the terminal device side, when the value of the resource bundling granularity is the first-type value and the second-type value, corresponding methods for determining a PRG or corresponding methods for determining a PRB bundling group are different.

Therefore, in this embodiment of this application, based on different values of the resource bundling granularity, different methods are used to determine the at least one precoding resource block group in the scheduling resource, so as to resolve a problem in the prior art, and meet requirements for different values of the resource bundling granularity.

With reference to the first aspect, in some implementations of the first aspect, the value of the resource bundling granularity is the first-type value, and the determining, by a network device based on a value of a resource bundling granularity, at least one precoding resource block group in a scheduling resource corresponding to a terminal includes determining, by the network device, the at least one precoding resource block group in the scheduling resource based on the value of the resource bundling granularity and a location of the scheduling resource in maximum available bandwidth of a system.

With reference to the first aspect, in some implementations of the first aspect, the determining, by the network device, the at least one precoding resource block group in the scheduling resource based on the value of the resource bundling granularity and a location of the scheduling resource in maximum available bandwidth of a system includes determining, by the network device, a first precoding resource block group in the scheduling resource according to the following formula:

$$PRG_{first}=P-N \bmod P$$

Where $PRG_{first}$ indicates that the first precoding resource block group includes first $PRG_{first}$ resource blocks in the scheduling resource, P indicates the value of the resource bundling granularity, N indicates an index that is of a first physical resource block PRB in the scheduling resource and that is in the maximum available bandwidth of the system, and N mod P indicates a remainder after N is divided by P, determining, by the network device, a last precoding resource block group in the scheduling resource according to the following formula:

$$PRG_{last}=(N+L) \bmod P$$

Where $PRG_{last}$ indicates that the last precoding resource block group includes last $PRG_{last}$ resource blocks in the scheduling resource, L indicates a quantity of PRBs in the scheduling resource, and (N+L) mod P indicates a remainder after N+L is divided by P, and determining, by the network device, that each of the other precoding resource block groups in the scheduling resource includes consecutive resource blocks, where a quantity of the consecutive resource blocks is the value of the resource bundling granularity in the scheduling resource.

With reference to the first aspect, in some implementations of the first aspect, the value of the resource bundling granularity is the second-type value, and the determining, by a network device based on a value of a resource bundling granularity, at least one precoding resource block group in a scheduling resource corresponding to a terminal includes determining, by the network device based on the value of the resource bundling granularity, the scheduling resource as a same precoding resource block group.

With reference to the first aspect, in some implementations of the first aspect, the first-type value includes 2 and 4, and the second-type value includes a size of consecutive scheduling bandwidth of the terminal device.

In other words, when the value of the resource bundling granularity is the second-type value, the network device does not need to determine the precoding resource block group by using the determining method corresponding to the first-type value, namely, based on the value of the resource bundling granularity and the location of the scheduling resource in the maximum available bandwidth of the system. The network device may directly determine the scheduling resource as a same precoding resource block group.

Therefore, in this embodiment of this application, when the value of the resource bundling granularity is the second-type value, the network device abandons the method for determining, in a resource division manner, a precoding resource block group, but directly uses the scheduling resource as a same PRG, so as to meet a requirement that when the resource bundling granularity is the second-type value, the network device performs same precoding on the entire scheduling resource, and avoid a problem in the prior art.

According to a second aspect, a communication method is provided, and the method includes determining, by a terminal device based on a value of a resource bundling granularity, at least one resource block bundling group in a scheduling resource corresponding to the terminal device, where the value of the resource bundling granularity is one of a first-type value and a second-type value, and a resource block bundling group determining method corresponding to the first-type value is different from a resource block bundling group determining method corresponding to the second-type value, and receiving, by the terminal device by using the at least one resource block bundling group, data transmitted by a network device.

Therefore, in this embodiment of this application, based on different values of the resource bundling granularity, different methods are used to determine the at least one resource block bundling group in the scheduling resource, so as to resolve a problem in the prior art, and meet requirements for different values of the resource bundling granularity.

It should be understood that the method on a terminal device side described in the second aspect is corresponding to the method for the network device described in the first aspect. For the method on the terminal device side, refer to description of a network device side. To avoid repetition, detailed description is appropriately omitted herein.

With reference to the second aspect, in some implementations of the second aspect, the value of the resource bundling granularity is the first-type value, and the determining, by a terminal device based on a value of a resource bundling granularity, at least one resource block bundling group in a scheduling resource corresponding to the terminal device includes determining, by the terminal device, the at least one resource block bundling group in the scheduling resource based on the value of the resource bundling granularity and a location of the scheduling resource in maximum available bandwidth of a system.

With reference to the second aspect, in some implementations of the second aspect, the determining, by the terminal device, the at least one resource block bundling group in the scheduling resource based on the value of the resource bundling granularity and a location of the scheduling resource in maximum available bandwidth of a system includes determining, by the terminal device, a first resource block bundling group in the scheduling resource according to the following formula:

$$PRBbundling_{first}=P-N \bmod P$$

Where $PRBbundling_{first}$ indicates that the first resource block bundling group includes first $PRBbundling_{first}$ resource blocks in the scheduling resource, P indicates the value of the resource bundling granularity, N indicates an index that is of a first PRB in the scheduling resource and that is in the maximum available bandwidth of the system, and N mod P indicates a remainder after N is divided by P, determining, by the terminal device, a last resource block bundling group in the scheduling resource according to the following formula:

$$PRBbundling_{last}=(N+L) \bmod P$$

Where $PRBbundling_{last}$ indicates that the last resource block bundling group includes last $PRBbundling_{last}$ resource blocks in the scheduling resource, L indicates a quantity of PRBs in the scheduling resource, and (N+L) mod P indicates a remainder after N+L is divided by P, and determining, by the terminal device, that each of the other resource block bundling groups in the scheduling resource includes consecutive resource blocks, where a quantity of the consecutive resource blocks is the value of the resource bundling granularity in the scheduling resource.

With reference to the second aspect, in some implementations of the second aspect, the value of the resource bundling granularity is the second-type value, and the determining, by a terminal device based on a value of a resource bundling granularity, at least one resource block bundling group in a scheduling resource corresponding to the terminal includes determining, by the terminal device based on the value of the resource bundling granularity, the scheduling resource as a same resource block bundling group.

With reference to the second aspect, in some implementations of the second aspect, the first-type value includes 2 and 4, and the second-type value includes a size of consecutive scheduling bandwidth of the terminal device.

According to a third aspect, a network device is provided, and the network device includes modules or units that are configured to perform the method in any one of the first aspect or the possible implementations of the first aspect.

According to a fourth aspect, a terminal device is provided, and the terminal device includes modules or units that are configured to perform the method in any one of the second aspect or the possible implementations of the second aspect.

According to a fifth aspect, a network device is provided, including a transceiver, a processor, and a memory. The processor is configured to control the transceiver to receive and send a signal, the memory is configured to store a computer program, and the processor is configured to invoke the computer program from the memory for running, so that the network device performs the method in the first aspect or the possible implementations of the first aspect.

According to a sixth aspect, a terminal device is provided, including a transceiver, a processor, and a memory. The processor is configured to control the transceiver to receive and send a signal, the memory is configured to store a computer program, and the processor is configured to invoke the computer program from the memory for running, so that the terminal device performs the method in the second aspect or the possible implementations of the second aspect.

According to a seventh aspect, a computer readable medium is provided, and a computer program is stored in the computer readable medium. The computer program is executed by a computer to perform the method in any one of the first aspect or the possible implementations of the first aspect.

According to an eighth aspect, a computer readable medium is provided, and a computer program is stored in the computer readable medium. The computer program is executed by a computer to perform the method in any one of the second aspect or the possible implementations of the second aspect.

According to a ninth aspect, a computer program product is provided, and the computer program product is executed by a computer to perform the method in any one of the first aspect or the possible implementations of the first aspect.

According to a tenth aspect, a computer program product is provided, and the computer program product is executed by a computer to perform the method in any one of the second aspect or the possible implementations of the second aspect.

According to an eleventh aspect, a processing apparatus is provided, including a processor and an interface, where the processor is configured to perform the methods in any one of the first aspect, the second aspect, the possible implementations of the first aspect, or the possible implementations of the second aspect, where a related data exchange process (for example, a process of transmitting or receiving data) is completed by using the interface. In a specific implementation process, the interface may further complete the data exchange process by using a transceiver.

It should be understood that the processing apparatus in the foregoing eleventh aspect may be a chip. The processor may be implemented by using hardware, or may be implemented by using software. When the processor is implemented by using the hardware, the processor may be a logic circuit, an integrated circuit, or the like, or when the processor is implemented by using the software, the processor may be a general-purpose processor, and is implemented by reading software code stored in the memory. The memory may be integrated into the processor, and may be located outside the processor, and may exist independently.

DETAILED DESCRIPTION OF ILLUSTRATIVE EMBODIMENTS

Figure 1:
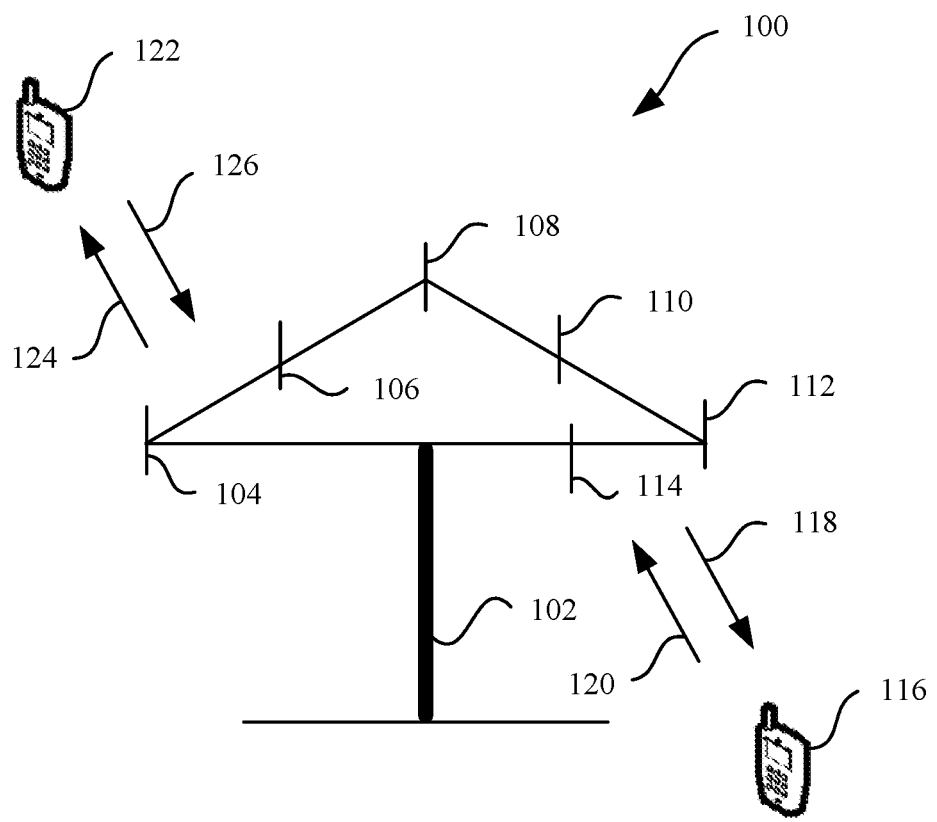
FIG. 1 is a schematic diagram of a scenario of a communications system applicable to an embodiment of this application.

The following describes technical solutions of this application with reference to accompanying drawings.

The embodiments of this application may be applied to various communications systems. Therefore, the following description is not limited to a specific communications system. For example, the embodiments of this application may be applied to a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), a Universal Mobile Telecommunications System (UMTS), a wireless local area network (WLAN), Wireless Fidelity (WiFi), or a next-generation communications system, namely, a 5th generation (5G) communications system, for example, a new radio (NR) system.

In the embodiments of this application, a network device may be a base transceiver station (BTS) in Global System for Mobile Communications (GSM) or Code Division Multiple Access (CDMA), or may be a nodeB (NB) in Wideband Code Division Multiple Access (WCDMA), or may be an evolved NodeB (eNB/eNodeB) in Long Term Evolution (LTE), or may be a relay station or an access point, or a network side device in a future 5G network, such as a transmission point (TRP or TP) in an NR system, a next generation Node B (gNB) in an NR system, or a radio frequency unit in an NR system, such as a remote radio unit, or one antenna panel or one group of (including a plurality of antenna panels) antenna panels of a base station in a 5G system. Different network devices may be located in a same cell, or may be located in different cells. This is not specifically limited herein.

In some deployments, the gNB may include a centralized unit (CU) and a distributed unit (DU). The gNB may further include a radio unit (RU). The CU implements a part of functions of the gNB, and the DU implements a part of functions of the gNB. For example, the CU implements radio resource control (RRC) and a function of a Packet Data Convergence Protocol (PDCP) layer, and the DU implements radio link control (RLC), media access control (MAC), and a function of a physical (PHY) layer. RRC layer information finally becomes PHY layer information, or is changed from PHY layer information. Therefore, in this architecture, higher-layer signaling, such as RRC layer signaling or PHCP layer signaling, may also be sent by the DU, or sent by both the DU and the RU. It may be understood that the network device may be a CU node, a DU node, or a device including a CU node and a DU node. In addition, the CU may be classified into a network device in a radio access network (RAN), or the CU may be classified into a network device in a core network CN. This is not limited herein.

A terminal device in the embodiments of this application may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless phone, a Session Initiation Protocol (SIP) phone, a wireless local loop (WLL) station, a personal digital assistant (PDA), a handheld device having a wireless communication function, a computing device or another processing device connected to a wireless modem, an in-vehicle device, a wearable device, a drone vehicle, a terminal device in a future 5G network, a terminal device in a future evolved public land mobile network (PLMN), or the like. This is not limited in the embodiments of this application.

By way of example and not limitation, in the embodiments of the present invention, the terminal device may alternatively be a wearable device. The wearable device may also be referred to as a wearable intelligent device, and the wearable intelligent device is a collective term of wearable devices that are developed after intelligent design is performed on daily wears by using a wearable technology, such as glasses, gloves, a watch, apparel, or shoes. The wearable device is a portable device that is directly worn on a body or integrated into clothing or an accessory of a user. The wearable device is not merely a hardware device, and further implements a powerful function through software support, data exchange, or cloud interaction. In a broad sense, the wearable intelligent device includes a device, such as a smart watch or smart glasses, that is of a full function and a large size and that can implement all or some functions without relying on a smartphone, and a device, such as a smart band or smart jewelry that performs sign monitoring, that is dedicated to only one type of application function and that needs to be used together with another device such as a smartphone.

The embodiments of this application may be applicable to any one of the foregoing communications systems. For example, the embodiments of this application may be applied to the LTE system and a subsequent evolved system such as 5G, or another wireless communications system using various radio access technologies, for example, a system using an access technology such as Code Division Multiple Access, Frequency Division Multiple Access, Time Division Multiple Access, Orthogonal Frequency Division Multiple Access, or Single Carrier Frequency Division Multiple Access, and in particular, to a scenario requiring channel information feedback and/or a scenario using a level-2 precoding technology, such as a wireless network using a massive multiple-input multiple-output (Massive MIMO) technology or a wireless network using a distributed antenna technology.

FIG. 1 is a schematic diagram of a scenario of a communications system applicable to an embodiment of this application. As shown in FIG. 1, a communications system 100 includes a network side device 102, and the network side device 102 may include a plurality of antenna groups. Each antenna group may include a plurality of antennas, for example, one antenna group may include antennas 104 and 106, another antenna group may include antennas 106 and no, and an additional group may include antennas 112 and 114. In FIG. 1, each antenna group has two antennas, however, each group may have more or fewer antennas. The network side device 102 may additionally include a transmitter chain and a receiver chain. A person of ordinary skill in the art may understand that both the transmitter chain and the receiver chain may include a plurality of components (for example, processors, modulators, multiplexers, demodulators, demultiplexers, or antennas) related to signal transmission and reception.

The network side device 102 may communicate with a plurality of terminal devices (for example, a terminal device 116 and a terminal device 122). However, it may be understood that the network side device 102 may communicate with any quantity of terminal devices that are similar to the terminal device 116 or 122. The terminal devices 116 and 122 may be, for example, cellular phones, smart phones, portable computers, handheld communications devices, handheld computing devices, satellite radio apparatuses, global positioning systems, PDAs, and/or any other appropriate devices configured to perform communication in the wireless communications system 100.

As shown in FIG. 1, the terminal device 116 communicates with the antennas 112 and 114. The antennas 112 and 114 send information to the terminal device 116 by using a forward link 118, and receive information from the terminal device 116 by using a reverse link 120. In addition, the terminal device 122 communicates with the antennas 104 and 106. The antennas 104 and 106 send information to the terminal device 122 by using a forward link 124, and receive information from the terminal device 122 by using a reverse link 126.

For example, in a frequency division duplex (FDD) system, the forward link 118 may use a frequency band different from that used by the reverse link 120, and the forward link 124 may use a frequency band different from that used by the reverse link 126.

For another example, in a time division duplex (TDD) system and a full duplex (full duplex) system, the forward link 118 and the reverse link 120 may use a same frequency band, and the forward link 124 and the reverse link 126 may use a same frequency band.

Each antenna group and/or each area designed for communication are/is referred to as a sector of the network side device 102. For example, the antenna group may be designed to communicate with a terminal device in a sector in a coverage area of the network side device 102. In a process in which the network side device 102 respectively communicates with the terminal devices 116 and 122 by using the forward links 116 and 124, a transmit antenna of the network side device 102 may improve signal-to-noise ratios of the forward links 116 and 124 through beamforming. In addition, compared with a manner in which a network side device sends, by using a single antenna, signals to all terminal devices served by the network side device, when the network side device 102 sends, through beamforming, signals to the terminal devices 116 and 122 that are randomly scattered in the related coverage area, less interference is caused to a mobile device in a neighboring cell.

During a given time, the network side device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive, or store) a specific quantity of data bits that need to be sent to the wireless communications receiving apparatus by using a channel. The data bits may be included in a transport block (or a plurality of transport blocks) of data, and the transport block may be segmented to generate a plurality of code blocks.

In addition, the communications system wo may be a public land mobile network PLMN network, a device-to-device (D2D) network, a machine-to-machine (M2M) network, or another network. FIG. 1 is merely a simplified schematic diagram of an example for ease of understanding. The network may further include another network device that is not shown in FIG. 1.

Figure 2:
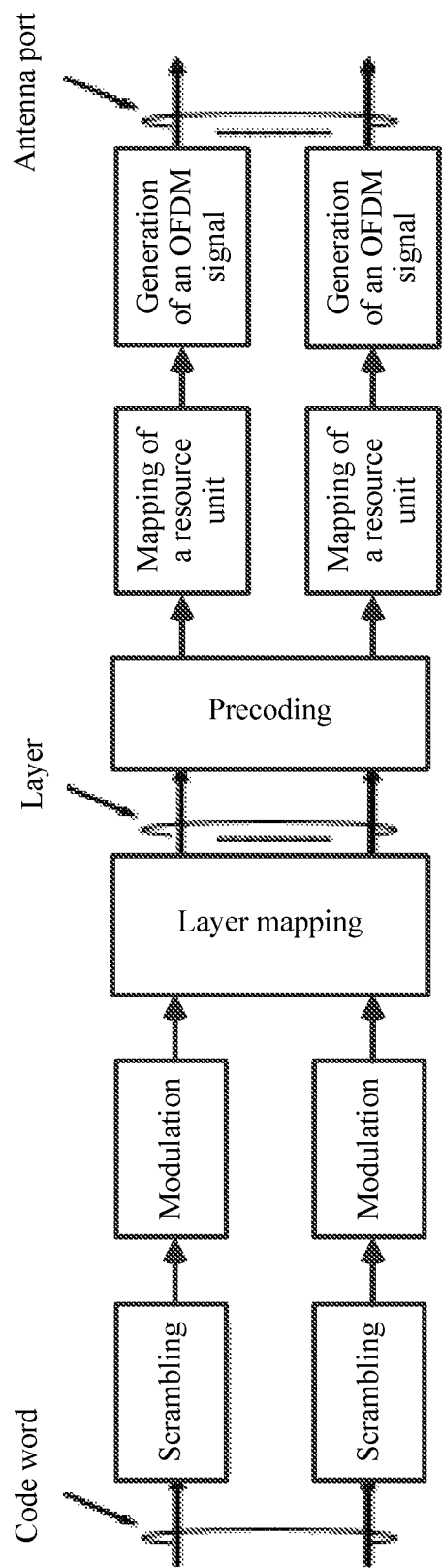
FIG. 2 is a schematic diagram of a data processing procedure according to an embodiment of this application.

FIG. 2 shows main steps of a data processing procedure performed by a transmit end (for example, a network device) before data is sent by using an orthogonal frequency division multiplexing (OFDM) symbol.

A code word is obtained after channel coding is performed on a service flow from an upper layer (for example, a media access control (MAC) layer), the code word is mapped to one or more layers after scrambling, modulation, and layer mapping, then precoding processing and mapping of a resource unit are performed on the code word, and finally a modulated symbol is sent by using an antenna port.

Correspondingly, a receive end (for example, a terminal device) may demodulate data. For each specific data processing procedure, refer to description in an existing standard.

To improve system performance, the transmit end and the receive end may use a resource bundling (for example, PRB bundling) technology. Specifically, the PRB bundling is to bind a plurality of consecutive PRBs together for joint processing. The transmit end (for example, a network device) may perform a same preprocessing (including beamforming and precoding) on the plurality of PRBs (or referred to as a PRG). The receive end (for example, a terminal device) may perform joint channel estimation across the plurality of PRBs, to demodulate received data.

As described above, in different scenarios (channel environments), comprehensively considering a channel estimation gain, terminal implementation complexity, a forming gain, and a scheduling status, optimal sizes of PRB bundling are different. In the existing standard, the PRB bundling may be configured in an NR system. Currently, optional configuration values may include 2, 4, consecutive scheduling bandwidth, and the like.

However, in existing PRB bundling application, each of the transmit end and the receive end determines a size of a precoding resource block group or a size of resource block bundling by using a default method, and consequently the existing PRB bundling application is not flexible, and it is difficult to meet requirements for different values of a PRB bundling size.

For example, when a value of the PRB bundling is the consecutive scheduling bandwidth, the network side device and the terminal device assume that an entire consecutive scheduling resource is used as a same precoding resource block group, in other words, the entire scheduling resource uses same precoding. However, according to a default method for determining a precoding resource block group according to an existing protocol, a plurality of precoding resource block groups may be determined.

In view of the foregoing problem, this embodiment of this application tactically provides a communication method. Specifically, in this embodiment of this application, a solution in which a precoding resource block group is determined only by using a default method is abandoned, but based on different values of the resource bundling granularity, different methods are used to determine at least one precoding resource block group or at least one resource block bundling group in a scheduling resource, so as to resolve a problem in the prior art, and meet requirements for different values of the resource bundling granularity.

For ease of understanding and description, by way of example and not limitation, the following describes an execution process and an execution action of the communication method in a communications system in this application.

Figure 3:
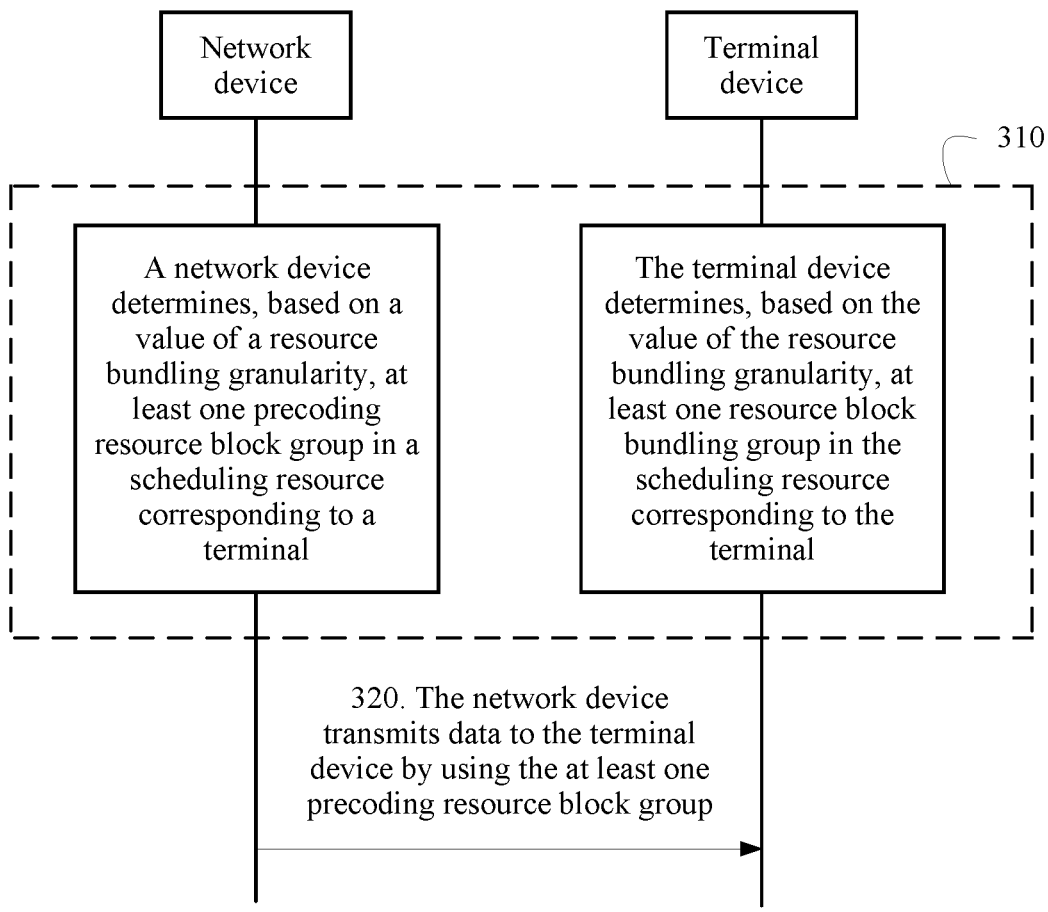
FIG. 3 is a schematic flowchart of a communication method according to an embodiment of this application.

FIG. 3 is a schematic flowchart of a communication method according to an embodiment of the present invention. The method shown in FIG. 3 may be applied to any one of the foregoing communications systems. Specifically, a communication method 300 described from a perspective of a system shown in FIG. 3 includes the following steps.

310. A network device determines, based on a value of a resource bundling granularity, at least one precoding resource block group in a scheduling resource corresponding to a terminal.

A type of the value of the resource bundling granularity is one of a first-type value and a second-type value, and a precoding resource block group determining method corresponding to the first-type value is different from a precoding resource block group determining method corresponding to the second-type value.

Actually, the type of the value of the resource bundling granularity may be one of a plurality of types of values, methods that are for determining a precoding resource block group and that are corresponding to all types of values may be different, and the plurality of types of values include at least the first-type value and the second-type value.

In a process of determining, based on the value of the resource bundling granularity, the at least one precoding resource block group in the scheduling resource corresponding to the terminal, the method for determining a precoding resource block group needs to be determined. In this case, the at least one precoding resource block group may be determined based on the value of the resource bundling granularity and the method for determining a precoding resource block group. In a specific implementation process, the method for determining a precoding resource block group may be determined based on the value of the resource bundling granularity. For example, the following correspondence may exist among a value of a resource bundling granularity, a type of the value, and a precoding resource block group determining method.

TABLE 1

| Value of a resource bundling granularity | Type of the value | Method for determining a precoding resource block group |
|---|---|---|
| 2 | First-type value | First method |
| 4 | First-type value | First method |
| Scheduling bandwidth | Second-type value | Second method |
| . . . | . . . | . . . |

In the foregoing Table 1, when the value of the resource bundling granularity is two or four PRBs, the two values belong to the first-type value, and the method for determining a precoding resource block group should be the first method. When the value of the resource bundling granularity is the scheduling bandwidth, the scheduling bandwidth belongs to the second-type value, and the method for determining a precoding resource block group is the second method.

It can be learned from Table 1 that, the correspondence exists among a value of a resource bundling granularity, a type of the value, and a precoding resource block group determining method. When the method for determining a precoding resource block group is determined, the type of the value may be determined based on the value of the resource bundling granularity, and then a corresponding method for determining a precoding resource block group is determined based on the type of the value, or the method for determining a precoding resource block group may be determined directly based on the value of the resource bundling granularity. It can be learned that the method for determining a precoding resource block group may be determined based on the value of the resource bundling granularity. Actually, in a specific implementation process, the method for determining a precoding resource block group may be determined based on the value of the resource bundling granularity by using various methods, and a specific method is not limited in this embodiment of the present invention.

Correspondingly, in another embodiment, the terminal device determines, based on the value of the resource bundling granularity, at least one resource block bundling group in the scheduling resource corresponding to the terminal.

Specifically, in an example of transmitting downlink data, the network device may send indication information to the terminal device, and the indication information indicates the resource bundling granularity. For example, the network device sends the indication information by using radio resource control (RRC) signaling or downlink control information (DCI). For example, the network device may indicate a specific value of the resource bundling granularity by using the RRC signaling. For example, values are 2, 4, and consecutive scheduling bandwidth of the terminal device. Alternatively, the network device may indicate a value range of the resource bundling granularity by using the RRC signaling. For example, the value range includes two of 2, 4, and consecutive scheduling bandwidth of the terminal device. The network device indicates, by using the DCI, that the resource bundling granularity is one value in the value range. Alternatively, the network device may indicate a value range of the resource bundling granularity by using the RRC signaling. For example, the value range includes 2, 4, and consecutive scheduling bandwidth of the terminal device. The network device indicates a specific value of the resource bundling granularity by using the DCI and a system configuration parameter. This embodiment of this application is not limited thereto. Afterwards, the network device may determine the at least one PRG in the scheduling resource based on the specific value of the resource bundling granularity by using a method corresponding to the value. Correspondingly, the terminal device may determine the at least one PRB bundling group in the scheduling resource based on the specific value of the resource bundling granularity by using a method corresponding to the value.

It should be understood that in this embodiment of this application, a case in which the network device determines the at least one PRG in the scheduling resource based on the value of the resource bundling granularity may be understood as at least one of a case in which the network device determines a size of the at least one PRG in the scheduling resource based on the value of the resource bundling granularity and a case in which the network device determines a resource location of the at least one PRG in the scheduling resource. Similarly, a case in which the terminal device determines the at least one PRB bundling group in the scheduling resource based on the value of the resource bundling granularity may be understood as at least one of a case in which the terminal device determines a size of the at least one PRB bundling group in the scheduling resource based on the value of the resource bundling granularity and a case in which the terminal device determines a resource location of the at least one PRB bundling group in the scheduling resource. This embodiment of this application is not limited thereto.

Optionally, the scheduling resource corresponding to the terminal device may be configured by the network device by using signaling such as DCI signaling. For example, the resource (or referred to as scheduling bandwidth) corresponding to the terminal device is one of a plurality of bandwidth parts (BWP) configured by the network device, or a part of frequency bands in one BWP, for example, a plurality of sub-bands. This embodiment of this application is not limited thereto. The bandwidth part may be understood as a segment of consecutive frequency bands, the frequency band includes at least one consecutive sub-band, and each bandwidth part may be corresponding to one group of system parameters (numerology) including but not limited to subcarrier spacing (Subcarrier spacing), a cyclic prefix (CP), and the like. Different bandwidth parts may be corresponding to different system parameters. Optionally, within a same transmission time interval (TTI), in the plurality of bandwidth parts, only one bandwidth part may be available, and another bandwidth part is unavailable. For a definition of the bandwidth part, refer to the prior art, for example, the definition includes but is not limited to various proposals for NR. As the technology continuously develops, the foregoing definition may also change.

It should be understood that in this embodiment of this application, the resource bundling granularity may also be referred to as a resource bundling size. The resource bundling granularity may be a physical resource block bundling (PRB bundling) granularity (or may be referred to as a resource block bundling group) or a precoding resource block group (PRG) granularity (or may be referred to as a precoding resource block group). This embodiment of this application is not limited thereto. The PRG granularity may indicate a quantity of consecutive PRBs on which same precoding is performed by a transmit end, and the PRB bundling granularity may indicate a quantity of PRBs across which joint channel estimation is performed by a receive end.

In this embodiment of this application, the PRG may be corresponding to the PRB bundling group, and resource bundling on different communications device sides may have different names but a same meaning. For example, a resource bundling granularity on a transmit end (for example, the network device) side is referred to as the PRG, and the transmit end performs same precoding on data transmitted in a same PRG. A resource bundling granularity on a receive end (for example, the terminal device) side is referred to as the PRB bundling group, and the receive end performs the joint channel estimation on data transmitted in a same PRB bundling group.

It should be noted that the PRG and the PRB bundling group are interchangeable. For example, resource bundling on each of the transmit end side and the receive end side may be the PRG, or resource bundling on each of the transmit end side and the receive end side may be the PRB bundling group. This embodiment of this application is not limited thereto.

It should be understood that the PRG on a network device side may be corresponding to the PRB bundling group on a terminal device side. For a same value of the resource bundling granularity, a method for determining a PRG on the network device side and a method for determining a PRB bundling group on the terminal device side may be the same. However, on a same side, namely, on the network device side or the terminal device side, when the value of the resource bundling granularity is the first-type value and the second-type value, corresponding methods for determining a PRG or corresponding methods for determining a PRB bundling group are different.

Therefore, in this embodiment of this application, based on different values of the resource bundling granularity, different methods are used to determine the at least one PRG or the PRB bundling group in the scheduling resource, so as to resolve a problem in the prior art, and meet requirements for different values of the resource bundling granularity.

Optionally, in an embodiment, the first-type value includes 2 and 4, and the second-type value includes a size of the consecutive scheduling bandwidth of the terminal device (or may be referred to as the scheduling bandwidth), in other words, entire scheduling bandwidth is used as one PRG or one PRB bundling group. It should be understood that the first-type value and the second-type value in this embodiment of this application may further include another value, and this embodiment of this application is not limited thereto.

The following describes in detail a specific method for determining a precoding resource block group by the network device when the resource bundling granularity is respectively the first-type value and the second-type value, and a specific method for determining a resource block bundling group by the terminal device when the resource bundling granularity is respectively the first-type value and the second-type value.

Case 1: In an embodiment, when the value of the resource bundling granularity is the first-type value, for example, 2 or 4, the network device may determine the at least one precoding resource block group in the scheduling resource based on the value of the resource bundling granularity and a location of the scheduling resource in maximum available bandwidth of a system.

Specifically, the maximum available bandwidth (such as a component carrier (component carrier)) of the system is divided in a unit of the value (for example, two PRBs or four PRBs) of the resource bundling granularity. Specifically, from a first PRB (a PRB with a lowest frequency band or a highest frequency band) in the maximum available bandwidth of the system, each resource block group is determined through division in the unit of the value of the resource bundling granularity in ascending order (correspondingly, the first PRB is a PRB with a lowest frequency band) or a descending order (correspondingly, the first PRB is a PRB with a highest frequency band) of frequencies. A start PRB in the scheduling resource (for example, a BWP) and a start PRB of a resource block group may be different. In this case, each of a quantity of PRBs included in a first precoding resource block group in the scheduling resource and a quantity of PRBs included in a last precoding resource block group may not be equal to the value of the resource bundling granularity.

Specifically, in another embodiment, the network device may determine a first precoding resource block group in the scheduling resource according to the following formula:

$$PRG_{first} = P - N \bmod P$$

Where $PRG_{first}$ indicates that the first precoding resource block group includes first $PRG_{first}$ resource blocks in the scheduling resource, P indicates the value of the resource bundling granularity, N indicates an index (or may be referred to as a number) that is of a first physical resource block PRB in the scheduling resource and that is in the maximum available bandwidth of the system, and N mod P indicates a remainder after N is divided by P.

The network device determines a last precoding resource block group in the scheduling resource according to the following formula:

$$PRG_{last} = (N+L) \bmod P$$

Where $PRG_{last}$ indicates that the last precoding resource block group includes last $PRG_{last}$ resource blocks in the scheduling resource, L indicates a quantity of PRBs in the scheduling resource, and (N+L) mod P indicates a remainder after N+L is divided by P.

The network device determines that each of the other precoding resource block groups in the scheduling resource (namely, the other remaining precoding resource block groups after the first precoding resource block group and the last precoding resource block group are removed from the scheduling resource, and the other precoding resource block groups may also be referred to as intermediate precoding resource block groups) includes consecutive resource blocks, where a quantity of the consecutive resource blocks is the value of the resource bundling granularity in the scheduling resource.

Figure 4:
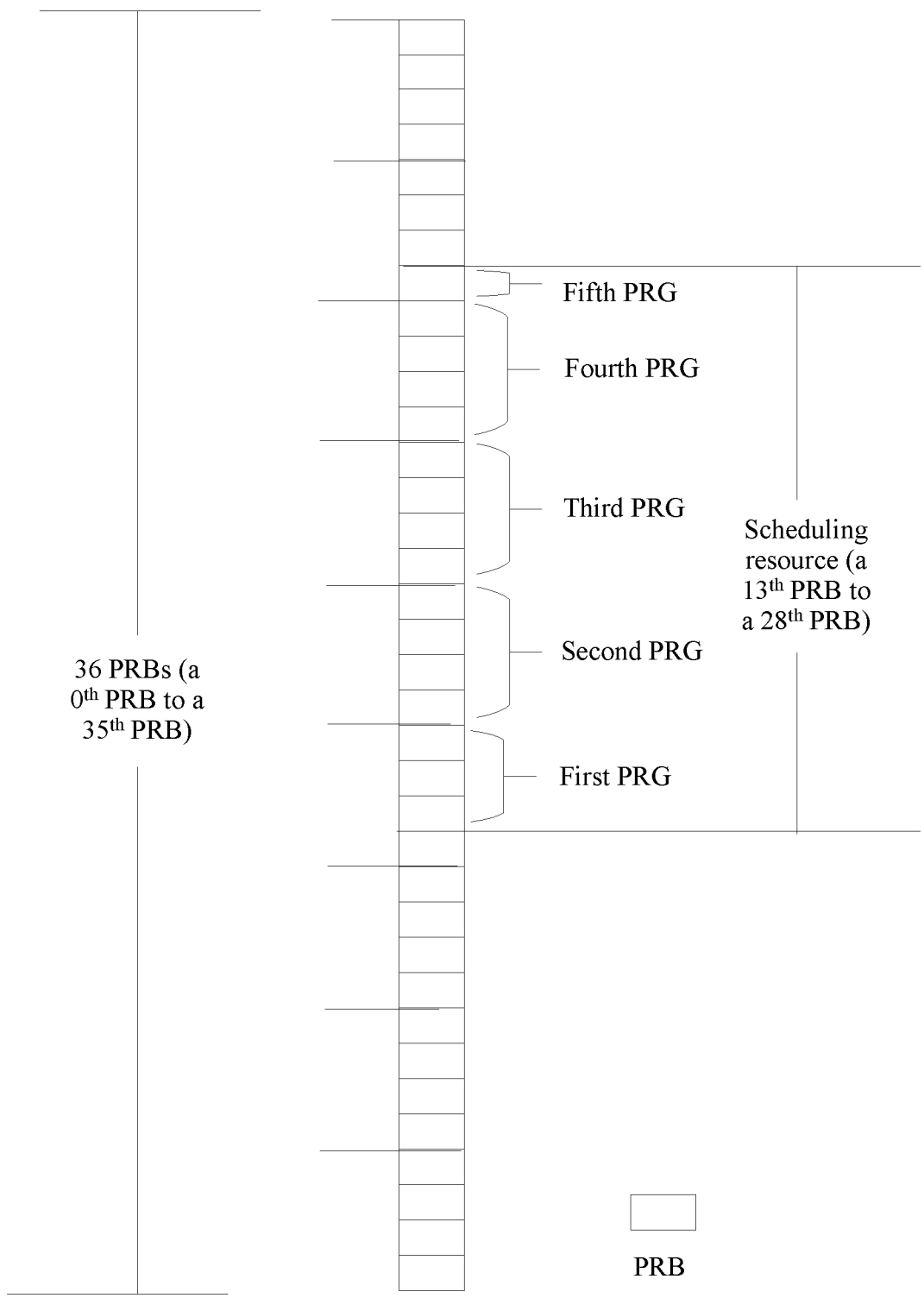
FIG. 4 is a schematic block diagram of determining a PRG according to an embodiment of this application.

For example, as shown in FIG. 4, it is assumed that the value of the resource bundling granularity is 4, and the maximum available bandwidth of the system includes 36 PRBs, namely, a $0^{th}$ PRB to a $35^{th}$ PRB from a low frequency band to a high frequency band. The scheduling resource includes a $13^{th}$ PRB to a $26^{th}$ PRB in the maximum available bandwidth of the system, in other words, a length L of the scheduling resource is 16. According to the above described method, it can be learned that P=4, N=13, and L=16. According to the foregoing method for determining a precoding resource block group, it can be learned that the scheduling resource includes five precoding resource block groups, and the start PRB in the scheduling resource and a start PRB of a fourth resource block group in the maximum available bandwidth of the system are different. Therefore, in the scheduling resource, each of a quantity of PRBs included in a first precoding resource block group (PRG) and a quantity of PRBs included in a last precoding resource block group is not equal to the value 4 of the resource bundling granularity. The first precoding resource block group includes three PRBs, and each of a second to a fourth precoding resource block groups includes four PRBs, and a fifth precoding resource block group includes one PRB. Specifically, the first precoding resource block group includes a 13$^{th}$ PRB to a 15$^{th}$ PRB in the maximum available bandwidth of the system, the second precoding resource block group includes a 16$^{th}$ PRB to a 19$^{th}$ PRB, the third precoding resource block group includes a 20$^{th}$ PRB to a 23$^{rd}$ PRB, the fourth precoding resource block group includes a 24$^{th}$ PRB to a 27$^{th}$ PRB, and the fifth precoding resource block group includes a 28$^{th}$ PRB.

Case 2: In an embodiment, when the value of the resource bundling granularity is the second-type value, for example, the size of the consecutive scheduling bandwidth of the terminal device, the network device may determine, based on the value of the resource bundling granularity, the scheduling resource as a same precoding resource block group, in other words, the second method is to use the entire scheduling resource (or referred to as scheduling bandwidth) as a same precoding resource block group.

In other words, when the value of the resource bundling granularity is the second-type value, the network device does not need to determine the precoding resource block group by using the method summarized in the case 1, namely, based on the value of the resource bundling granularity and the location of the scheduling resource in the maximum available bandwidth of the system. The network device may directly determine the scheduling resource as a same precoding resource block group.

Figure 5:
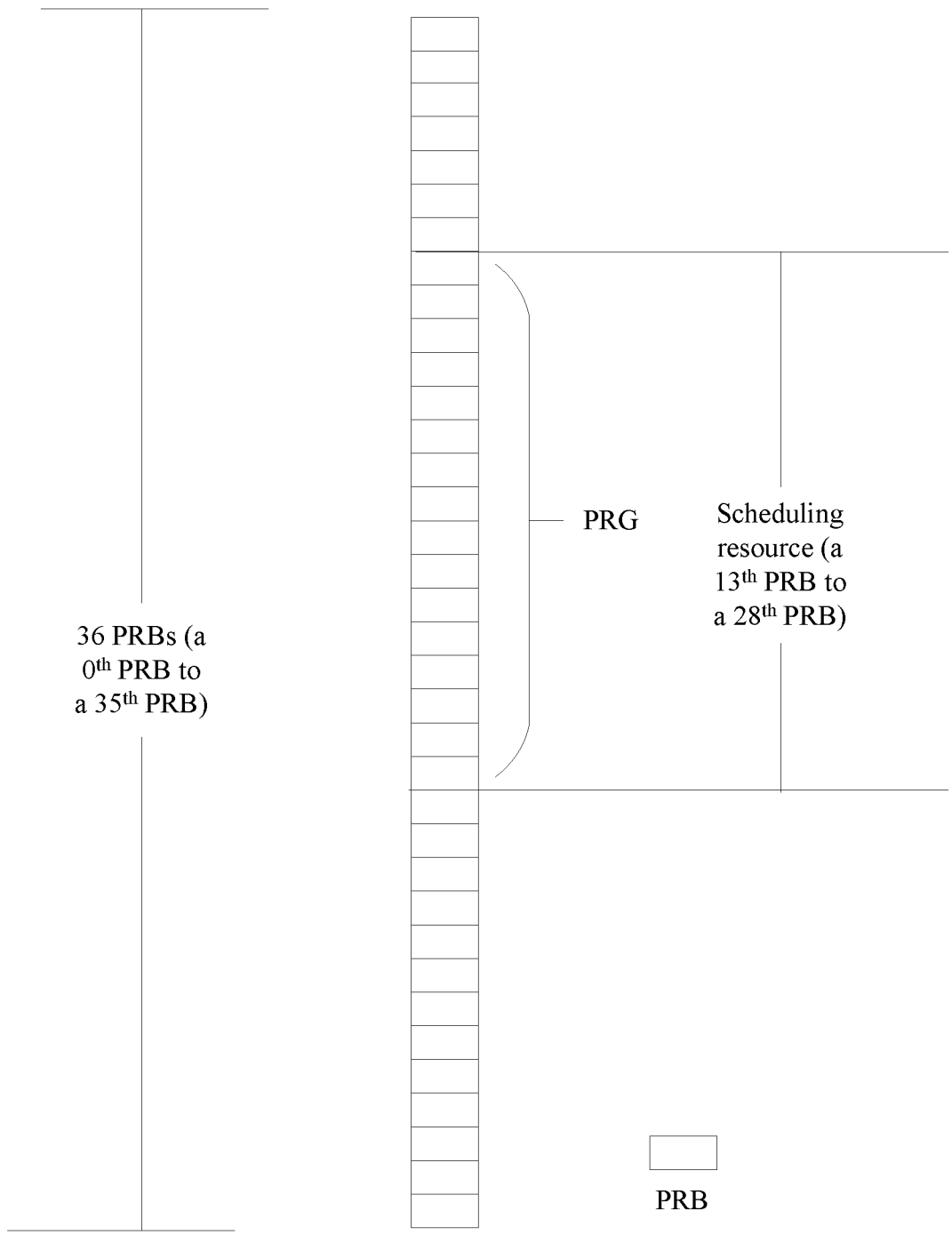
FIG. 5 is a schematic block diagram of determining a PRG according to another embodiment of this application.

For example, as shown in FIG. 5, the maximum available bandwidth of the system includes 36 PRBs, namely, a 0$^{th}$ PRB to a 35$^{th}$ PRB, and the scheduling resource includes a 13$^{th}$ PRB to a 28$^{th}$ PRB in the maximum available bandwidth of the system. When the value of the resource bundling granularity is the second-type value (for example, the size of the consecutive scheduling bandwidth), the network device may directly determine that all PRBs, namely, the 13$^{th}$ PRB to the 28$^{th}$ PRB, in the scheduling resource are one precoding resource block group.

Therefore, in this embodiment of this application, when the value of the resource bundling granularity is the second-type value, the network device abandons the method for determining, in a resource division manner, a precoding resource block group, but directly uses the scheduling resource as a same PRG, so as to meet a requirement that when the resource bundling granularity is the second-type value, the network device performs same precoding on the entire scheduling resource, and avoid a problem in the prior art.

The foregoing describes the method for determining a precoding resource block group by the network device when the value of the resource bundling granularity is each of the first-type value and the second-type value. The following describes the method for determining resource block bundling by the terminal device when the value of the resource bundling granularity is each of the first-type value and the second-type value.

It should be understood that the method for determining resource block bundling by the terminal device is corresponding to the method for determining a precoding resource block group by the network device. Therefore, to avoid repetition, the method for determining resource block bundling on the terminal device side is appropriately omitted herein.

Case 1: In an embodiment, when the value of the resource bundling granularity is the first-type value, the terminal device determines the at least one resource block bundling group in the scheduling resource based on the value of the resource bundling granularity and a location of the scheduling resource in maximum available bandwidth of a system.

Specifically, the terminal device determines a first resource block bundling group in the scheduling resource according to the following formula:

$$\text{PRBbundling}_{first} = P - N \bmod P$$

Where PRBbundling$_{first}$ indicates that the first resource block bundling group includes first PRBbundling$_{first}$ resource blocks in the scheduling resource, P indicates the value of the resource bundling granularity, N indicates an index that is of a first PRB in the scheduling resource and that is in the maximum available bandwidth of the system, and N mod P indicates a remainder after N is divided by P.

The terminal device determines a size of a last resource block bundling group in the scheduling resource according to the following formula:

$$\text{PRBbundling}_{last} = (N+L) \bmod P$$

Where PRBbundling$_{last}$ indicates that the last resource block bundling group includes last PRBbundling$_{last}$ resource blocks in the scheduling resource, L indicates a quantity of PRBs in the scheduling resource, and (N+L) mod P indicates a remainder after N+L is divided by P.

The terminal device determines that each of the other resource block bundling groups in the scheduling resource includes consecutive resource blocks, where a quantity of the consecutive resource blocks is the value of the resource bundling granularity in the scheduling resource.

Case 2: In an embodiment, the value of the resource bundling granularity is the second-type value.

The terminal device determines, based on the value of the resource bundling granularity, the scheduling resource as a same resource block bundling group.

Therefore, in this embodiment of this application, when the value of the resource bundling granularity is the second-type value, the terminal device abandons the method for determining, in a resource division manner, a resource block bundling group, but directly uses the scheduling resource as a same resource block bundling group, so as to meet a requirement that when the resource bundling granularity is the second-type value, the terminal device performs joint channel estimation on the entire scheduling resource, and avoid a problem in the prior art.

320. The network device transmits data to the terminal device by using the at least one precoding resource block group.

Correspondingly, the terminal device receives, by using the at least one resource block bundling, data transmitted by the network device.

Specifically, the network device performs, based on a determined precoding resource block group, same precoding on data in a same precoding resource block group (for example, performs precoding by using a same precoding matrix), and then transmits the data to the terminal device after a precoding processing procedure described in FIG. 2. Correspondingly, the terminal device performs, based on a determined resource block bundling group, joint channel estimation on data in a same resource block bundling group for decoding, and finally obtains data sent by the network device.

Therefore, in this embodiment of this application, based on different values of the resource bundling granularity, different methods are used to determine the at least one PRG or the PRB bundling group in the scheduling resource, so as to resolve a problem in the prior art, and meet requirements for different values of the resource bundling granularity.

It should be understood that the examples in FIG. 1 to FIG. 5 are merely intended to help a person skilled in the art understand the embodiments of the present invention rather than restricting the embodiments of the present invention to a specific numerical value or a specific scenario that is illustrated. A person skilled in the art certainly can make various equivalent modifications or changes according to the examples provided in FIG. 1 to FIG. 5, and such modifications or changes also fall within the scope of the embodiments of the present invention.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The foregoing describes the data transmission method in the embodiments of the present invention in detail with reference to FIG. 1 to FIG. 5. The following describes a device in the embodiments of the present invention with reference to FIG. 6 and FIG. 7.

Figure 6:
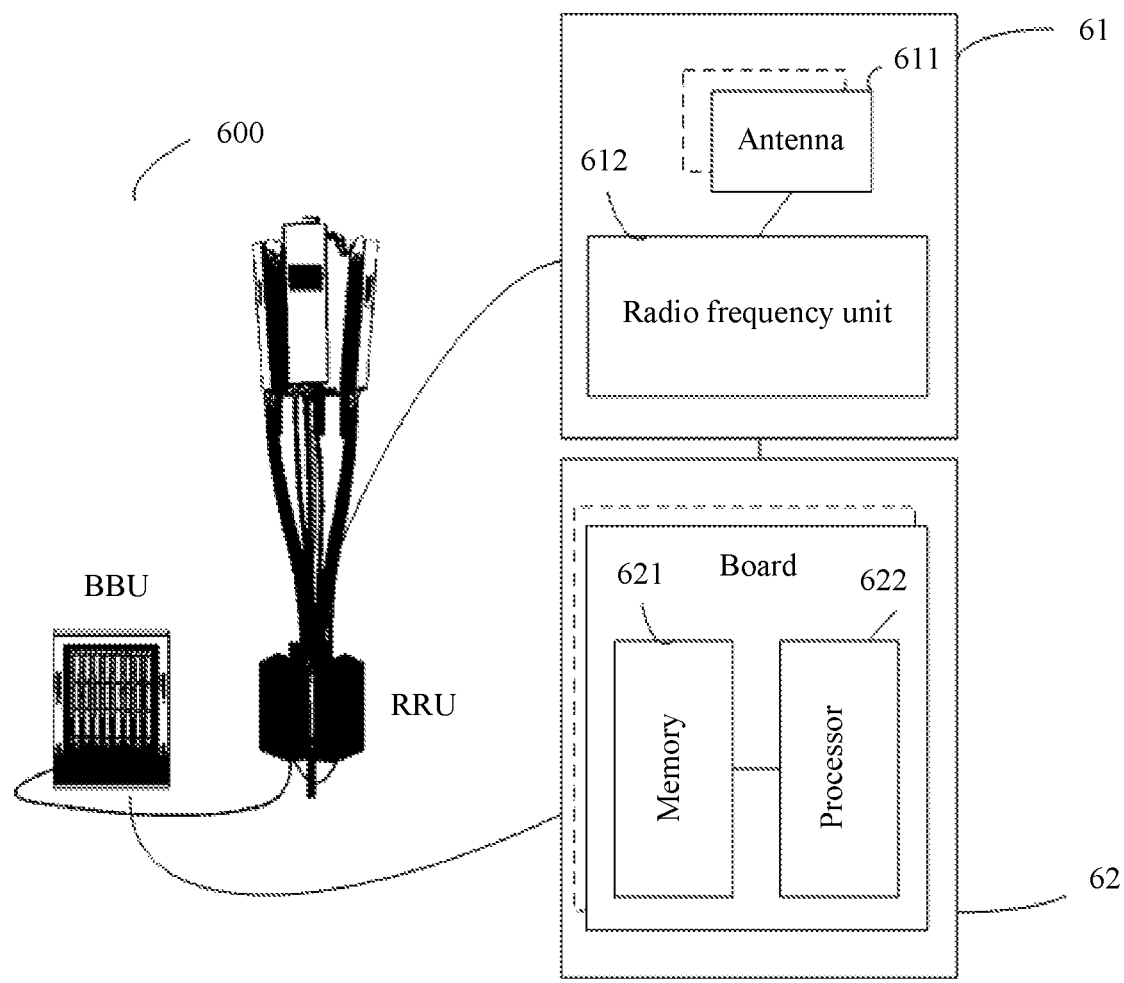
FIG. 6 is a schematic block diagram of a network device according to an embodiment of this application.

FIG. 6 is a schematic structural diagram of a network device according to an embodiment of this application, for example, may be a schematic structural diagram of a base station. As shown in FIG. 6, a network device 600 may be applied to the system shown in FIG. 1, to execute a function of the network device in the foregoing method embodiment.

The network device 600 may include one or more radio frequency units, such as a remote radio unit (RRU) 61 and one or more baseband units (BBU) (also referred to as a digital unit (DU)) 62. The RRU 61 may be referred to as a transceiver unit 61. Optionally, the transceiver unit may also be referred to as a transceiver machine, a transceiver circuit, a transceiver, or the like, and may include at least one antenna 611 and a radio frequency unit 612. The RRU 61 is mainly configured to receive and send a radio frequency signal, and perform conversion between the radio frequency signal and a baseband signal, for example, configured to send precoding matrix information to a terminal device. The BBU 62 is mainly configured to perform baseband processing, control a base station, or the like. The RRU 61 and the BBU 62 may be physically disposed together, or may be physically separated, namely, a distributed base station.

The BBU 62 is a control center of a base station, or may be referred to as a processing unit 62, which is mainly configured to implement a baseband processing function, such as channel coding, multiplexing, modulation, spectrum spreading, or the like. For example, the BBU (a processing unit) may be configured to control the base station to execute an operation procedure for the network device in the foregoing method embodiment.

In an example, the BBU 62 may include one or more boards, and a plurality of boards may jointly support a single-access-standard radio access network (such as an LTE network), or may separately support radio access networks (such as an LTE network, a 5G network, or another network) of different access standards. The BBU 62 further includes a memory 621 and a processor 622. The memory 621 is configured to store a necessary instruction and data. The processor 622 is configured to control the base station to perform a necessary action, for example, configured to control the base station to execute the operation procedure for the network device in the foregoing method embodiment. The memory 621 and the processor 622 may serve the one or more boards. In other words, a memory and a processor may be disposed on each board. Alternatively, the plurality of boards may use a same memory and processor. In addition, a necessary circuit may further be disposed on each board.

Optionally, in an embodiment, the processing unit is configured to determine, based on a value of a resource bundling granularity, at least one precoding resource block group in a scheduling resource corresponding to a terminal device, where the value of the resource bundling granularity is one of a first-type value and a second-type value, and a precoding resource block group determining method corresponding to the first-type value is different from a precoding resource block group determining method corresponding to the second-type value, and the transceiver unit is configured to transmit data to the terminal device by using the at least one precoding resource block group.

Therefore, in this embodiment of this application, based on different values of the resource bundling granularity, different methods are used to determine the at least one PRG in the scheduling resource, so as to resolve a problem in the prior art, and meet requirements for different values of the resource bundling granularity.

Optionally, in another embodiment, the value of the resource bundling granularity is the first-type value, and the processing unit is specifically configured to determine the at least one precoding resource block group in the scheduling resource based on the value of the resource bundling granularity and a location of the scheduling resource in maximum available bandwidth of a system.

Optionally, in another embodiment, the processing unit is specifically configured to determine a first precoding resource block group in the scheduling resource according to the following formula:

$$PRG_{first} = P - N \bmod P$$

Where $PRG_{first}$ indicates that the first precoding resource block group includes first $PRG_{first}$ resource blocks in the scheduling resource, P indicates the value of the resource bundling granularity, N indicates an index that is of a first physical resource block PRB in the scheduling resource and that is in the maximum available bandwidth of the system, and N mod P indicates a remainder after N is divided by P, determine a last precoding resource block group in the scheduling resource according to the following formula:

$$PRG_{last} = (N+L) \bmod P$$

Where $PRG_{last}$ indicates that the last precoding resource block group includes last $PRG_{last}$ resource blocks in the scheduling resource, L indicates a quantity of PRBs in the scheduling resource, and (N+L) mod P indicates a remainder after N+L is divided by P, and determine that another precoding resource block group in the scheduling resource includes consecutive resource blocks, where a quantity of consecutive resource blocks is the value of the resource bundling granularity in the scheduling resource.

Optionally, in another embodiment, the value of the resource bundling granularity is the second-type value, and the processing unit is specifically configured to determine, based on the value of the resource bundling granularity, the scheduling resource as a same precoding resource block group.

Optionally, in another embodiment, the first-type value includes 2 and 4, and the second-type value includes a size of consecutive scheduling bandwidth of the terminal device.

It should be understood that the network device 600 shown in FIG. 6 can implement the processes of the network device related to the method embodiments in FIG. 1 to FIG. 5. Operations and/or functions of each module in the network device 600 are respectively used to implement the corresponding procedures in the foregoing method embodiments. For details, refer to the description in the foregoing method embodiments. To avoid repetition, detailed description is appropriately omitted herein.

Figure 7:
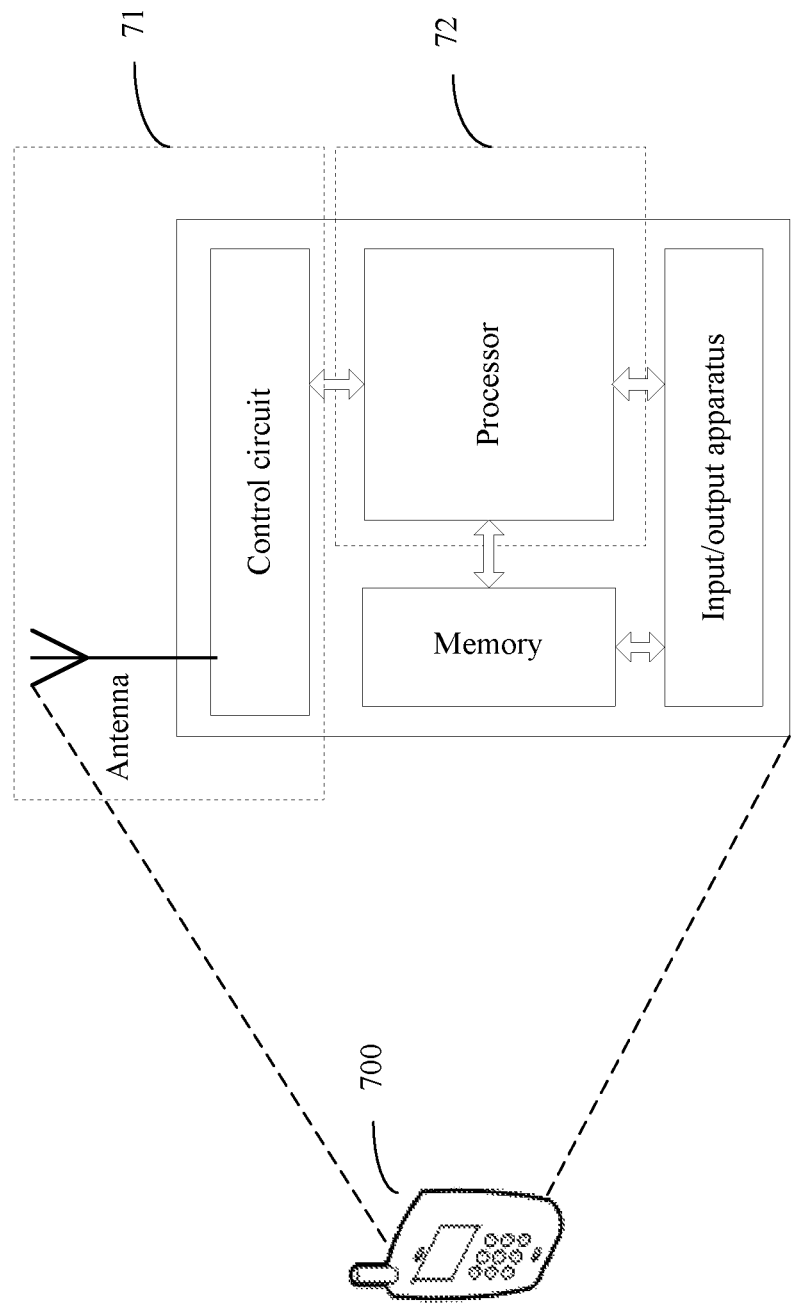
FIG. 7 is a schematic block diagram of a terminal device according to an embodiment of this application.

FIG. 7 is a schematic structural diagram of a terminal device according to an embodiment of this application. The terminal device may be applied to the system shown in FIG. 1. For ease of description, FIG. 7 shows only main components of the terminal device. As shown in FIG. 7, a terminal device 700 includes a processor, a memory, a control circuit, an antenna, and an input/output apparatus. The processor is mainly configured to process a communications protocol and communication data, control the entire terminal device, execute a software program, and process data of the software program, for example, configured to support the terminal device in executing the action described in the foregoing method embodiment. The memory is mainly configured to store a software program and data. The control circuit is mainly configured to perform conversion between a baseband signal and a radio frequency signal, and process the radio frequency signal. A combination of the control circuit and the antenna may also be referred to as a transceiver, and is mainly configured to receive and send a radio frequency signal in an electromagnetic wave form. The input/output apparatus, such as a touchscreen, a screen, or a keyboard, is mainly configured to receive data entered by a user, and output data to the user.

After the terminal device is powered on, the processor may read the software program in the memory, explain and execute an instruction of the software program, and process the data of the software program. When the processor needs to send data by using the antenna, the processor outputs a baseband signal to the radio frequency circuit after performing baseband processing on the to-be-sent data. After performing radio frequency processing on the baseband signal, the radio frequency circuit sends a radio frequency signal in an electromagnetic wave form by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that, for ease of description, FIG. 7 shows only one memory and only one processor. Actually, the terminal device may include a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process a communications protocol and communication data, and the central processing unit is mainly configured to control the entire terminal device, execute a software program, and process data of the software program. The processor in FIG. 7 may integrate functions of the baseband processor and the central processing unit. A person skilled in the art may understand that the baseband processor and the central processing unit may be separate processors, and are interconnected by using a technology such as a bus. A person skilled in the art may understand that the terminal device may include a plurality of baseband processors to adapt to different network standards, the terminal device may include a plurality of central processing units to enhance a processing capability of the terminal device, and all components of the terminal device may be connected to each other by using various buses. The baseband processor may also be expressed as a baseband processing circuit or a baseband processing chip. The central processing unit may also be expressed as a central processing circuit or a central processing chip. A function of processing the communications protocol and the communication data may be embedded in the processor, or may be stored in the storage unit in a form of a software program. The processor executes the software program to implement a baseband processing function.

In this embodiment of the present invention, an antenna and a control circuit that have a transceiving function may be considered as a transceiver unit 71 of the terminal device 700. For example, the transceiver unit 71 is configured to support the terminal device in executing a transceiving function executed by the terminal device in the method embodiments in FIG. 1 to FIG. 5. A processor that has a processing function is considered as a processing unit 72 of the terminal device 700. As shown in FIG. 7, the terminal device 700 includes the transceiver unit 71 and the processing unit 72. The transceiver unit may also be referred to as a transceiver, a transceiver machine, a transceiver apparatus, or the like. Optionally, a component that is in the transceiver unit 71 and that is configured to implement a receiving function may be considered as a receiving unit, and a component that is in the transceiver unit 71 and that is configured to implement a sending function may be considered as a sending unit. In other words, the transceiver unit 71 includes the receiving unit and the sending unit, the receiving unit may also be referred to as a receiver, an input port, a receiver circuit, or the like, and the sending unit may be referred to as a transmitter machine, a transmitter, a transmitter circuit, or the like.

The processing unit 72 may be configured to execute an instruction stored in the memory, to control the transceiver unit 71 to receive a signal and/or send a signal, and implement a function of the terminal device in the foregoing method embodiment. In an implementation, a function of the transceiver unit 71 may be implemented by using a transceiver circuit or a dedicated transceiver chip.

Optionally, in an embodiment, the processing unit is configured to determine, based on a value of a resource bundling granularity, at least one resource block bundling group in a scheduling resource corresponding to the terminal device, where the value of the resource bundling granularity is one of a first-type value and a second-type value, and a resource block bundling group determining method corresponding to the first-type value is different from a resource block bundling group determining method corresponding to the second-type value, and the transceiver unit is configured to receive, by using the at least one resource block bundling group, data transmitted by a network device.

Therefore, in this embodiment of this application, based on different values of the resource bundling granularity, different methods are used to determine the at least one PRB bundling group in the scheduling resource, so as to resolve a problem in the prior art, and meet requirements for different values of the resource bundling granularity.

Optionally, in another embodiment, the value of the resource bundling granularity is the first-type value, and the processing unit is specifically configured to determine the at least one resource block bundling group in the scheduling resource based on the value of the resource bundling granularity and a location of the scheduling resource in maximum available bandwidth of a system.

Optionally, in another embodiment, the processing unit is specifically configured to determine a first resource block bundling group in the scheduling resource according to the following formula:

$$PRBbundling_{first}=P-N \bmod P$$

Where $PRBbundling_{first}$ indicates that the first resource block bundling group includes first $PRBbundling_{first}$ resource blocks in the scheduling resource, P indicates the value of the resource bundling granularity, N indicates an index that is of a first PRB in the scheduling resource and that is in the maximum available bandwidth of the system, and N mod P indicates a remainder after N is divided by P, determine a last resource block bundling group in the scheduling resource according to the following formula:

$$PRBbundling_{last}=(N+L) \bmod P$$

Where $PRBbundling_{last}$ indicates that the last resource block bundling group includes last $PRBbundling_{last}$ resource blocks in the scheduling resource, L indicates a quantity of PRBs in the scheduling resource, and (N+L) mod P indicates a remainder after N+L is divided by P, and determine that each of the other resource block bundling groups in the scheduling resource includes consecutive resource blocks, where a quantity of the consecutive resource blocks is the value of the resource bundling granularity in the scheduling resource.

Optionally, in another embodiment, the value of the resource bundling granularity is the second-type value, and the processing unit is specifically configured to determine, based on the value of the resource bundling granularity, the scheduling resource as a same resource block bundling group.

Optionally, in another embodiment, the first-type value includes 2 and 4, and the second-type value includes a size of consecutive scheduling bandwidth of the terminal device.

It should be understood that the terminal device 700 shown in FIG. 7 can implement the processes of the terminal device related to the method embodiments in FIG. 1 to FIG. 5. Operations and/or functions of each module in the terminal device 700 are respectively used to implement the corresponding procedures in the foregoing method embodiment. For details, refer to the description in the foregoing method embodiments. To avoid repetition, detailed description is appropriately omitted herein.

An embodiment of this application further provides a processing apparatus, including a processor and an interface, and the processor is configured to perform the communication method in any one of the foregoing method embodiments.

It should be understood that the foregoing processing apparatus may be a chip. For example, the processing apparatus may be a field-programmable gate array (Field-Programmable Gate Array, FPGA), may be an application-specific integrated circuit (ASIC), may be a system on chip (SoC), may be a central processing unit (CPU), may be a network processor (NP), may be a digital signal processing (DSP), may be a micro controller unit (MCU), or may be a programmable controller (Programmable Logic Device, PLD) or another integrated chip.

In an implementation process, steps in the foregoing methods can be implemented by using a hardware integrated logical circuit in the processor, or by using instructions in a form of software. The steps of the method disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor. To avoid repetition, details are not described herein again.

It should be understood that the processor in the embodiments of the present invention may be an integrated circuit chip, and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the steps, and logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor.

It may be understood that the memory in the embodiments of the present invention may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

An embodiment of this application further provides a communications system, including the foregoing network device and the terminal device.

An embodiment of this application further provides a computer readable medium, and a computer program is stored in the computer readable medium. The computer program is executed by a computer to perform the communication method in any one of the foregoing method embodiments.

An embodiment of this application further provides a computer program product, and the computer program product is executed by a computer to perform the communication method in any one of the foregoing method embodiments.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be understood that the foregoing describes a communication method in downlink transmission in a communications system. However, this application is not limited thereto. Optionally, a similar solution may also be used for uplink transmission. To avoid repetition, details are not described herein again.

It should be understood that "one embodiment" or "an embodiment" mentioned throughout the specification means that particular features, structures, or characteristics related to the embodiment are included in at least one embodiment of the present invention. Therefore, "in one embodiment" or "in an embodiment" appearing throughout the specification does not necessarily refer to a same embodiment. In addition, these particular features, structures, or characteristics may be combined in one or more embodiments in any appropriate manner. It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Terms such as "component", "module", and "system" used in this specification are used to indicate computer-related entities, hardware, firmware, combinations of hardware and software, software stored on a non-transitory computer readable medium, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from one component interacting with another component in a local system, a distributed system, and/or across a network such as the Internet interacting with other systems by using the signal).

It should be further understood that "first", "second", "third", "fourth", and various numbers in this specification are merely used for differentiation for ease of description, and are not construed as a limitation on the scope of the embodiments of this application.

The term "and/or" in this specification describes only an association relationship for describing associated objects and represents that three relationships may exist. For example, A and/or B may represent the following three cases Only A exists, both A and B exist, and only B exists.

A person of ordinary skill in the art may be aware that, illustrative logical blocks (illustrative logical block) and steps (step) described in the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions (programs). When the computer program instructions (programs) are loaded and executed on the computer, the procedures or functions according to the embodiments of this application are all or partially generated. The computer may be a general-purpose computer, a dedicated computer, a computer network, or another programmable apparatus. The computer instructions may be stored in a non-transitory computer readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A terminal device, comprising:
a transceiver;
a processor connected to the transceiver;
a non-transitory computer-readable storage medium storing a program to be executed by the processor, the program including instructions to:
determine, when a value of a resource bundling granularity is a first-type value, at least one resource block bundling group in a scheduling resource corresponding to the terminal device based on the first-type value, and receive, through the transceiver, using the at least one resource block bundling group, data transmitted from a network device, wherein the first-type value comprises 2 or 4; and
determine, when the value of the resource bundling granularity is a second-type value, the scheduling resource corresponding to the terminal device as one resource block bundling group, and receive, through the transceiver, using the one resource block bundling group, data transmitted from the network device, wherein, the second-type value comprises a size of a consecutive scheduling bandwidth of the terminal device.

2. The terminal device according to claim 1, wherein the instructions to determine the at least one resource block bundling group include instructions to perform, when the value of the resource bundling granularity is the first-type value:
determining a first resource block bundling group in the scheduling resource corresponding to the terminal device, wherein the first resource block bundling group comprises first $\text{PRBbundling}_{first}$ resource blocks in the scheduling resource, and wherein $\text{PRBbundling}_{first}$ and the value of the resource bundling granularity satisfy:

$$\text{PRBbundling}_{first} = P - N \bmod P$$

wherein $\text{PRBbundling}_{first}$ is a number indicating that the first resource block bundling group comprises first $\text{PRBbundling}_{first}$ resource blocks in the scheduling resource, wherein P indicates the value of the resource bundling granularity, wherein N indicates an index that is of a first physical resource block (PRB) in the scheduling resource and that is in a maximum available bandwidth of a system, and wherein N mod P indicates a remainder after N is divided by P;
determining a last resource block bundling group in the scheduling resource, wherein the last resource block bundling group comprises last $\text{PRBbundling}_{last}$ resource blocks in the scheduling resource, wherein $\text{PRBbundling}_{last}$ and the value of the resource bundling granularity satisfy:

$$\text{PRBbundling}_{last} = (N+L) \bmod P$$

wherein $\text{PRBbundling}_{last}$ is a number indicating that the last resource block bundling group comprises last $\text{PRBbundling}_{last}$ resource blocks in the scheduling resource, wherein P indicates the value of the resource bundling granularity, wherein L indicates a quantity of PRBs in the scheduling resource, and wherein (N+L) mod P indicates a remainder after N+L is divided by P; and
determining that each of the other resource block bundling group in the scheduling resource comprises consecutive resource blocks, wherein a quantity of the consecutive resource blocks is the value of the resource bundling granularity in the scheduling resource.

3. The terminal device according to claim 1, wherein the value of the resource bundling granularity is indicated in indication information sent to the terminal device using radio resource control (RRC) signaling or downlink control information (DCI).

4. The terminal device according to claim 3, wherein the value of the resource bundling granularity is indicated as a specific value in indication information sent to the terminal device using the RRC signaling.

5. The terminal device according to claim 3, wherein a value range of the value of the resource bundling granularity is indicated in information sent to the terminal device using the RRC signaling, and wherein the value, selected from the value range, of the resource bundling granularity is indicated in information sent to the terminal device using the DCI.

6. A processing apparatus, comprising:
a processor, and
a non-transitory computer-readable storage medium storing a program to be executed by the processor, wherein the program includes instructions for:
  performing, when a value of a resource bundling granularity is a first-type value:
    determining at least one resource block bundling group in a scheduling resource corresponding to a terminal device based on the first-type value of the resource bundling granularity, wherein, the first-type value comprises 2 or 4; and
    receiving, using the at least one resource block bundling group, data transmitted from a network device;
  performing, when the value of the resource bundling granularity is a second-type value:
    determining the scheduling resource corresponding to the terminal device as one resource block bundling group, wherein, the second-type value comprises a size of a consecutive scheduling bandwidth of the terminal device; and
    receiving, using the one resource block bundling group, data transmitted from the network device.

7. The processing apparatus according to claim 6, wherein the instructions for determining the at least one resource block bundling group includes instructions to perform, when the value of the resource bundling granularity is the first-type value:
  determining a first resource block bundling group in the scheduling resource corresponding to the terminal device, wherein the first resource block bundling group comprises first $\text{PRBbundling}_{first}$ resource blocks in the scheduling resource, and wherein $\text{PRBbundling}_{first}$ and the value of the resource bundling granularity satisfy:

$$\text{PRBbundling}_{first} = P - N \bmod P$$

wherein $\text{PRBbundling}_{first}$ is a number indicating that the first resource block bundling group comprises first $\text{PRBbundling}_{first}$ resource blocks in the scheduling resource, wherein P indicates the value of the resource bundling granularity, wherein N indicates an index that is of a first physical resource block (PRB) in the scheduling resource and that is in a maximum available bandwidth of a system, and wherein N mod P indicates a remainder after N is divided by P;
  determining a last resource block bundling group in the scheduling resource, wherein the last resource block bundling group comprises last $\text{PRBbundling}_{last}$ resource blocks in the scheduling resource, and wherein $\text{PRBbundling}_{last}$ and the value of the resource bundling granularity satisfy:

$$\text{PRBbundling}_{last} = (N+L) \bmod P$$

wherein $\text{PRBbundling}_{last}$ is a number indicating that the last resource block bundling group comprises last $\text{PRBbundling}_{last}$ resource blocks in the scheduling resource, wherein P indicates the value of the resource bundling granularity, wherein L indicates a quantity of PRBs in the scheduling resource, and wherein (N+L) mod P indicates a remainder after N+L is divided by P; and
  determining that each of the other resource block bundling group in the scheduling resource comprises consecutive resource blocks, wherein a quantity of the consecutive resource blocks is the value of the resource bundling granularity in the scheduling resource.

8. The processing apparatus according to claim 6, wherein the value of the resource bundling granularity is indicated in indication information sent to the terminal device using radio resource control (RRC) signaling or downlink control information (DCI).

9. The processing apparatus according to claim 8, wherein the value of the resource bundling granularity is indicated as a specific value in indication information sent to the terminal device using the RRC signaling.

10. The processing apparatus according to claim 8, wherein a value range of the value of the resource bundling granularity is indicated in information sent to the terminal device using the RRC signaling, and wherein the value, selected from the value range, of the resource bundling granularity is indicated in information sent to the terminal device using the DCI.

11. A communication method, comprising:
  performing, by a terminal device, when a value of a resource bundling granularity is a first-type value:
    determining at least one resource block bundling group in a scheduling resource corresponding to the terminal device based on the first-type value of the resource bundling granularity, wherein, the first-type value comprises 2 or 4; and
    receiving, using the at least one resource block bundling group, data transmitted from a network device;
  performing, by the terminal device, when the value of the resource bundling granularity is a second-type value:
    determining the scheduling resource corresponding to the terminal device as one resource block bundling group, wherein, the second-type value comprises a size of a consecutive scheduling bandwidth of the terminal device; and
    receiving, using the one resource block bundling group, data transmitted from the network device.

12. The method according to claim 11, wherein the determining the at least one resource block bundling group includes performing, when the value of the resource bundling granularity is the first-type value:
  determining, by the terminal device, a first resource block bundling group in the scheduling resource corresponding to the terminal device, wherein the first resource block bundling group comprises first $\text{PRBbundling}_{first}$ resource blocks in the scheduling resource, and wherein $\text{PRBbundling}_{first}$ and the value of the resource bundling granularity satisfy:

$$\text{PRBbundling}_{first} = P - N \bmod P$$

wherein $\text{PRBbundling}_{first}$ is a number indicating that the first resource block bundling group comprises first $\text{PRBbundling}_{first}$ resource blocks in the scheduling resource, wherein P indicates the value of the resource bundling granularity, wherein N indicates an index that is of a first physical resource block (PRB) in the scheduling resource and that is in a maximum available bandwidth of a system, and wherein N mod P indicates a remainder after N is divided by P;
  determining, by the terminal device, a last resource block bundling group in the scheduling resource, wherein the last resource block bundling group comprises last $\text{PRBbundling}_{last}$ resource blocks in the scheduling resource, and wherein $\text{PRBbundling}_{last}$ and the value of the resource bundling granularity satisfy:

$$\text{PRBbundling}_{last} = (N+L) \bmod P$$

wherein $\text{PRBbundling}_{last}$ is a number indicating that the last resource block bundling group comprises last PRBbundling$_{last}$ resource blocks in the scheduling resource, wherein P indicates the value of the resource bundling granularity, wherein L indicates a quantity of PRBs in the scheduling resource, and wherein (N+L) mod P indicates a remainder after N+L is divided by P; and determining, by the terminal device, that each of the other resource block bundling group in the scheduling resource comprises consecutive resource blocks, wherein a quantity of the consecutive resource blocks is the value of the resource bundling granularity in the scheduling resource.

13. The method according to claim 11, wherein the value of the resource bundling granularity is indicated in indication information sent to the terminal device using radio resource control (RRC) signaling or downlink control information (DCI).

14. The method according to claim 13, wherein the value of the resource bundling granularity is indicated as a specific value in indication information sent to the terminal device using the RAC signaling.

15. The method according to claim 13, wherein a value range of the value of the resource bundling granularity is indicated in information sent to the terminal device using the RRC signaling, and wherein the value, selected from the value range, of the resource bundling granularity is indicated in information sent to the terminal device using the DCI.

16. A non-transitory computer readable storage medium having a computer program stored thereon, wherein the computer program, when executed by a computer, causes the computer to:

perform, when a value of a resource bundling granularity is a first-type value:
  determining at least one resource block bundling group in a scheduling resource corresponding to a terminal device based on the first-type value of the resource bundling granularity, wherein, the first-type value comprises 2 or 4; and
  receiving, using the at least one resource block bundling group, data transmitted from a network device;

perform, when the value of the resource bundling granularity is a second-type value:
  determining the scheduling resource corresponding to the terminal device as one resource block bundling group, wherein the second-type value comprises a size of a consecutive scheduling bandwidth of the terminal device; and
  receiving, using the one resource block bundling group, data transmitted from the network device.

17. The non-transitory computer readable storage medium according to claim 16, wherein the determining the at least one resource block bundling group, comprises performing, when the value of the resource bundling granularity is the first-type value:

determining a first resource block bundling group in the scheduling resource corresponding to the terminal device, wherein the first resource block bundling group comprises first PRBbundling$_{first}$ resource blocks in the scheduling resource, wherein PRBbundling$_{first}$ and wherein the value of the resource bundling granularity satisfy:

PRBbundling$_{first}$=P–N mod P wherein PRBbundling$_{first}$ is a number indicating that the first resource block bundling group comprises first PRBbundling$_{first}$ resource blocks in the scheduling resource, wherein P indicates the value of the resource bundling granularity, wherein N indicates an index that is of a first physical resource block (PRB) in the scheduling resource and that is in a maximum available bandwidth of a system, and wherein N mod P indicates a remainder after N is divided by P;

determining a last resource block bundling group in the scheduling resource wherein the last resource block bundling group comprises last PRBbundling$_{last}$ resource blocks in the scheduling resource, and wherein PRBbundling$_{last}$ and the value of the resource bundling granularity satisfy:

PRBbundling$_{last}$=(N+L)mod P wherein PRBbundling$_{last}$ is a number indicating that the last resource block bundling group comprises last PRBbundling$_{last}$ resource blocks in the scheduling resource, wherein P indicates the value of the resource bundling granularity, wherein L indicates a quantity of PRBs in the scheduling resource, and wherein (N+L) mod P indicates a remainder after N+L is divided by P; and determining that each of the other resource block bundling group in the scheduling resource comprises consecutive resource blocks, wherein a quantity of the consecutive resource blocks is the value of the resource bundling granularity in the scheduling resource.

18. The non-transitory computer readable storage medium according to claim 16, wherein the value of the resource bundling granularity is indicated in indication information sent to the terminal device using radio resource control (RRC) signaling or downlink control information (DCI).

19. The non-transitory computer readable storage medium according to claim 18, wherein the value of the resource bundling granularity is indicated as a specific value in indication information sent to the terminal device using the RRC signaling.

20. The non-transitory computer readable storage medium according to claim 18, wherein a value range of the value of the resource bundling granularity is indicated in information sent to the terminal device using the RRC signaling, and wherein the value, selected from the value range, of the resource bundling granularity is indicated in information sent to the terminal device using the DCI.

21. A processing apparatus, comprising:
a processor, and
a non-transitory computer-readable storage medium storing a program to be executed by the processor, wherein the program includes instructions for:
  performing, when a value of a resource bundling granularity is a first-type value:
    determining at least one resource block bundling group in a scheduling resource corresponding to a terminal device based on the first-type value of the resource bundling granularity, wherein, the first-type value comprises 2 or 4; and
    transmitting, using the at least one resource block bundling group, data to the terminal device;
  performing, when the value of the resource bundling granularity is a second-type value:
    determining the scheduling resource corresponding to the terminal device as one resource block bundling group, wherein, the second-type value comprises a size of a consecutive scheduling bandwidth of the terminal device; and
    transmitting, using the one resource block bundling group, data to the terminal device.

22. The processing apparatus according to claim 21, wherein the instructions for determining the at least one resource block bundling group includes instructions to perform, when the value of the resource bundling granularity is the first-type value:
  determining a first resource block bundling group in the scheduling resource corresponding to the terminal device, wherein the first resource block bundling group comprises first PRBbundling$_{first}$ resource blocks in the scheduling resource, and wherein PRBbundling$_{first}$ and the value of the resource bundling granularity satisfy:

PRBbundling$_{first}$=P−N mod P wherein PRBbundling$_{first}$ is a number indicating that the first resource block bundling group comprises first PRBbundling$_{first}$ resource blocks in the scheduling resource, wherein P indicates the value of the resource bundling granularity, wherein N indicates an index that is of a first physical resource block (PRB) in the scheduling resource and that is in a maximum available bandwidth of a system, and wherein N mod P indicates a remainder after N is divided by P;
  determining a last resource block bundling group in the scheduling resource, wherein the last resource block bundling group comprises last PRBbundling$_{last}$ resource blocks in the scheduling resource, and wherein PRBbundling$_{last}$ and the value of the resource bundling granularity satisfy:

PRBbundling$_{last}$=(N+L)mod P wherein PRBbundling$_{last}$ is a number indicating that the last resource block bundling group comprises last PRBbundling$_{last}$ resource blocks in the scheduling resource, wherein P indicates the value of the resource bundling granularity, wherein L indicates a quantity of PRBs in the scheduling resource, and wherein (N+L) mod P indicates a remainder after N+L is divided by P; and
  determining that each of the other resource block bundling group in the scheduling resource comprises consecutive resource blocks, wherein a quantity of the consecutive resource blocks is the value of the resource bundling granularity in the scheduling resource.

23. A communication method, comprising:
  performing, by a network device, when a value of a resource bundling granularity is a first-type value:
    determining at least one resource block bundling group in a scheduling resource corresponding to a terminal device based on the first-type value of the resource bundling granularity, wherein, the first-type value comprises 2 or 4; and
    transmitting, using the at least one resource block bundling group, data to the terminal device;
  performing, by the network device, when the value of the resource bundling granularity is a second-type value:
    determining the scheduling resource corresponding to the terminal device as one resource block bundling group, wherein, the second-type value comprises a size of a consecutive scheduling bandwidth of the terminal device; and
    transmitting, using the one resource block bundling group, data to the terminal device.

24. The method according to claim 23, wherein the determining the at least one resource block bundling group comprises performing, when the value of the resource bundling granularity is the first-type value:
  determining a first resource block bundling group in the scheduling resource corresponding to the terminal device, wherein the first resource block bundling group comprises first PRBbundling$_{first}$ resource blocks in the scheduling resource, and wherein PRBbundling$_{first}$ and the value of the resource bundling granularity satisfy:

PRBbundling$_{first}$=P−N mod P wherein PRBbundling$_{first}$ is a number indicating that the first resource block bundling group comprises first PRBbundling$_{first}$ resource blocks in the scheduling resource, wherein P indicates the value of the resource bundling granularity, wherein N indicates an index that is of a first physical resource block (PRB) in the scheduling resource and that is in a maximum available bandwidth of a system, and wherein N mod P indicates a remainder after N is divided by P;
  determining a last resource block bundling group in the scheduling resource, wherein the last resource block bundling group comprises last PRBbundling$_{last}$ resource blocks in the scheduling resource, and wherein PRBbundling$_{last}$ and the value of the resource bundling granularity satisfy:

PRBbundling$_{last}$=(N+L)mod P wherein PRBbundling$_{last}$ is a number indicating that the last resource block bundling group comprises last PRBbundling$_{last}$ resource blocks in the scheduling resource, wherein P indicates the value of the resource bundling granularity, wherein L indicates a quantity of PRBs in the scheduling resource, and wherein (N+L) mod P indicates a remainder after N+L is divided by P; and
  determining that each of the other resource block bundling group in the scheduling resource comprises consecutive resource blocks, wherein a quantity of the consecutive resource blocks is the value of the resource bundling granularity in the scheduling resource.

* * * * *

UNITED STATES PATENT AND TRADEMARK OFFICE
CERTIFICATE OF CORRECTION

PATENT NO. : 10,720,975 B2
APPLICATION NO. : 16/575747
DATED : July 21, 2020
INVENTOR(S) : Yong Liu It is certified that error appears in the above-identified patent and that said Letters Patent is hereby corrected as shown below:

In the Claims

In Column 29, Line 20, Claim 14, delete "RAC" and insert --RRC--.

Signed and Sealed this
Thirteenth Day of October, 2020

Andrei Iancu
*Director of the United States Patent and Trademark Office*